(12) United States Patent
Bowden, Jr. et al.

(10) Patent No.: US 11,921,256 B2
(45) Date of Patent: Mar. 5, 2024

(54) NEURAL ORDINARY DIFFERENTIAL EQUATION NETWORK FOR RESERVOIR MODELING

(71) Applicant: CHEVRON U.S.A. INC., San Ramon, CA (US)

(72) Inventors: Larry A. Bowden, Jr., Houston, TX (US); Lokendra Jain, Houston, TX (US); Irina V. Prestwood, Houston, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 415 days.

(21) Appl. No.: 17/219,663

(22) Filed: Mar. 31, 2021

(65) Prior Publication Data

US 2022/0317332 A1    Oct. 6, 2022

(51) Int. Cl.
| | | |
|---|---|---|
| *G01V 99/00* | (2009.01) | |
| *G06F 17/13* | (2006.01) | |
| *G06F 30/27* | (2020.01) | |
| *G06F 30/28* | (2020.01) | |
| *G06N 3/02* | (2006.01) | |
| *G06F 111/04* | (2020.01) | |
| *G06F 113/08* | (2020.01) | |

(52) U.S. Cl.
CPC .......... *G01V 99/005* (2013.01); *G06F 17/13* (2013.01); *G06F 30/27* (2020.01); *G06F 30/28* (2020.01); *G06N 3/02* (2013.01); *G06F 2111/04* (2020.01); *G06F 2113/08* (2020.01)

(58) Field of Classification Search
CPC ....... G01V 99/005; G06F 17/13; G06F 30/27; G06F 30/28; G06F 2111/04; G06F 2113/08; G06N 3/02; G06N 3/044; E21B 43/00; E21B 2200/20; E21B 2200/22

See application file for complete search history.

(56) References Cited

U.S. PATENT DOCUMENTS

| | | |
|---|---|---|
| 10,190,395 B2 | 1/2019 | Sayarpour |
| 10,619,456 B2 | 4/2020 | Zhang |
| 10,648,291 B2 | 5/2020 | Zhang |
| 10,718,186 B2 | 7/2020 | Sayarpour |
| 10,760,379 B2 | 9/2020 | Sayarpour |
| 10,934,811 B2 | 3/2021 | Sayarpour |

(Continued)

OTHER PUBLICATIONS

Yewgat et al. "Deep-CRM: A New Deep Learning Approach for Capacitance Resistive Models" ECMOR XVII—17th European Conference on the Mathematics of Oil Recovery, Sep. 14-17, 2020, Edinburgh, UK (Year: 2020).*

(Continued)

*Primary Examiner* — Rehana Perveen
*Assistant Examiner* — Troy A Maust
(74) *Attorney, Agent, or Firm* — Esplin & Associates, PC

(57) ABSTRACT

Differential equations defining physics of a reservoir are modeled as a neural network. Measured data for the reservoir is used as boundary condition to calculate the different equation parameters. The result is a neural ordinary differential equation network that models reservoir characteristics (e.g., inter-well connectivities, response times for injection wells and production wells) using physics that are encoded into the network. The neural ordinary differential equation network provides a solution for the reservoir that is constrained by the physics of the reservoir.

21 Claims, 11 Drawing Sheets

(56) References Cited

U.S. PATENT DOCUMENTS

| | | |
|---|---|---|
| 2015/0051838 A1 | 2/2015 | Champenoy |
| 2016/0177690 A1 | 6/2016 | Sayarpour |
| 2016/0178799 A1 | 6/2016 | Sayarpour |
| 2022/0025765 A1* | 1/2022 | Delgoshaie ............. E21B 41/00 |

OTHER PUBLICATIONS

Mall et al. "Application of Legendre Neural Network for solving ordinary differential equations" Applied Soft Computing, vol. 43, 2016, pp. 347-356 (Year: 2016).*

Chen Ricky T. Q., Rubanova Yulia, Bettencourt Jesse, Duvenaud David (2019). Neural Ordinary Differential Equations. University of Toronto, Vector Institute. (pp. 1-18).

Rackauckas Chris et al. DiffEqFlux.jl—A Julia Library for Neural Differential Equations (2019) (pp. 1-17).

Weber, et al. "Improvements in Capacitance-Resistive Modeling and Optimization of Large Scale Reservoirs," SPE 121299, 2009 SPE Western Regional Meeting held in San Jose, Calif., USA, Mar. 24-26, 2009 (p. 1-17).

Sayarpour, et al., "The Use of Capacitance-Resistive Models for Rapid Estimation of Waterflood Performance and Optimization", SPE 110081, 2007 SPE Annual Technical Conference and Exhibition held in Anaheim, Calif., USA, Nov. 11-14, 2007. (pp. 1-13).

Sayarpour, et al., "Field Applications of Capacitance Resistive Models in Waterfloods", SPE 114983-MS, 2008 SPE Annual Technical Conference and Exhibition held in Denver, Colo., USA, Sep. 21-24, 2008. (pp. 1-15).

Sayarpour, et al., "Field Applications of Capacitance Resistive Models in Waterfloods", SPE 114983-PA, Dec. 2009 SPE Reservoir Evaluation & Engineering. (pp. 1-12).

Sayarpour, et al., "Probabilistic History Matching With the Capacitance-Resistance Model in Waterfloods: A Precursor to Numerical Modeling", SPE 129604, 2010 SPE Improved Oil Recovery Symposium held in Tulsa, Okla., USA, Apr. 24-28, 2010. (pp. 1-13).

Sayarpour, M., "Development and Application of Capacitance-Resistive Models to Water/CO2 Floods", pp. 1-236, available at http://repositories.lib.utexas.edu/handle/2152/15357?show=full, which are all incorporated by reference in their entireties. 7 U.S. Pat. No. 10,760,379, titled "Flooding Analysis Tool and Method Thereof"(pp. 1-236).

* cited by examiner $$\mathcal{L}(\theta) := \underbrace{\frac{1}{N_u} \sum_{i=1}^{N_u} |u_i - f_\theta(x_i)|^2}_{\text{Data fit}} + \underbrace{\frac{1}{\lambda} \mathcal{R}[f_\theta(x)]}_{\text{Physics regularization}}$$

FIG. 3

Injection_rate_I1 =
[284.6624  284.6743  284.6771  284.6746  284.6664  284.6516
284.6283  284.5931  555.1354  555.0648  555.0361  2717.121
2716.909  2716.857  3537.007  3537.209  454.2328  454.2205
454.2086  1297.769  1297.827  1386.995  2040.08   2040.237
1074.394  1409.096  1187.767  1453.882  1149.305  1329.487
1376.219  1881.046  1538.514  1002.312  612.8742  1373.664
1424.084  1352.598  1479.259  767.9471  1277.077  1477.096
1383.378  1398.408  1353.671  882.6218  1399.007  1159.061
1507.469  1089.506  1642.942  1799.764  1873.927  2145.548
2017.962  1993.64   2221.32   2123.962  2463.256  2405.041
2404.414  2438.734  2638.787  2616.91   2346.845  2852.143
2942.838  3140.032  762.2396  1720.488  1789.752  371.4107
1225.91   1686.064  1652.747  1724.248  1655.486  1552.557
1870.383  1807.614  1498.599  1376.45   1453.844  1441.684
1363.064  1066.156  1365.101  1358.903  1288.348  610.3185
832.7502  1573.272  1768.713  1781.088  1747.261  1977.836
1904.75   1538.454  1678.361  1774.035  1495.381  1285.172
1511.251  1627.114  1626.432  1579.333  1574.744  1435.232
2135.695  2031.769  2350.99   2562.418  2515.922  2709.281
3000.712]

Injection_rate_I2=
[1824.588  1824.665  1824.682  1824.666  1824.613  1824.519
1824.37   1824.144  1367.973  1367.799  1367.728  626.0895
626.0406  626.0286  299.3024  299.3194  1420.26   1420.222
1420.185  1626.06   1626.133  1181.016  1067.529  1067.611
1346.783  1286.029  1669.494  1469.061  1571.632  1369.969
1342.855  1635.875  1769.014  1876.71   1794.846  1658.31
1526.607  1876.101  1705.561  1641.514  1605.627  1298.534
1591.755  1811.691  1571.183  1584.321  1572.848  1532.965
1524.934  1534.853  1538.834  1463.963  1462.23   1420.739
1447.045  1406.715  1419.408  1478.69   1273.244  1262.34
1165.642  787.8699  657.2443  617.5942  672.4419  562.5458
600.0635  553.3339  581.2515  686.7953  448.5355  1967.524
968.7045  1253.422  1417.029  1348.352  607.6661  795.2877
1122.037  951.7014  1218.465  1452.847  1708.894  1789.318
1774.066  1730.023  1792.384  1647.639  1532.214  1398.604
1456.599  1405.635  1341.6    1384.068  1547.139  1480.687
1527.453  1541.885  1348.729  1359.007  1093.668  1078.121
1202.416  895.9857  1175.532  1010.464  967.2054  851.1081
740.4431  930.6541  1057.503  1036.018  1250.418  1382.047
1540.569]

FIG. 4A

```
Injection_rate_I3=
  [278.5883   278.6001   278.6027   278.6003   278.5922   278.5778
   278.555    278.5205   922.1713   922.054    922.0063   967.21
   967.1343   967.1157   774.6002   774.6443   772.0591   772.0982
   772.018    870.8308   870.8698   904.8117   825.425    792.9547
   876.54     882.7752   681.8339   775.945    1081.869   928.0758
   921.4498   1079.74    795.1276   810.2282   835.9764   825.9167
   825.2587   943.9789   745.8108   709.2183   718.3409   656.4478
   553.8104   682.1406   863.1352   837.0597   850.8278   789.4566
   827.334    813.5239   723.0217   808.3031   871.0251   1023.663
   1008.41    1118.704   1113.178   907.1154   726.4997   1064.354
   1208.275   1269.964   1226.312   834.8596   952.5087   1019.817
   922.9584   886.3052   898.9753   868.3796   869.4521   105.3649
   407.1053   136.8827   722.5133   841.0006   706.9567   543.9826
   198.147    233.6965   114.3593   252.4854   284.3101   418.044
   215.6109   543.6895   654.181    927.2443   896.0264   822.9401
   878.3534   692.4314   738.8477   984.3605   1069.655   1022.925
   1002.807   850.6902   991.8134   1034.01    1148.745   1142.539
   1163.838   1275.52    1145.691   1460.11    1377.891   1306.395
   1304.617   1278.456   1378.95    1374.073   1449.972   1184.909
   1291.567]

Injection_rate_I4=
  [270.0509   270.0623   270.0648   270.0624   270.0547   270.0407
   270.0186   269.9851   631.4337   631.3534   631.3207   607.871
   607.8235   607.8118   570.1067   570.1392   471.9973   471.9845
   471.9722   374.8601   374.8769   482.6559   509.4759   299.6612
   601.047    612.4909   599.3603   368.4525   541.0823   637.376
   572.6961   520.8604   602.978    508.6731   518.9494   559.4774
   583.3226   665.8262   675.3377   604.7722   619.4575   567.0582
   700.1987   680.9487   720.6385   697.012    662.4166   683.2136
   659.8345   667.4672   707.6854   743.7268   858.9993   832.3246
   779.6216   698.0973   703.4314   791.7886   726.9083   854.6981
   834.7772   832.5445   812.7689   727.6645   652.1965   826.5865
   849.4389   811.6799   850.7483   832.3735   819.6655   1042.436
   720.7501   952.0648   1195       848.0734   976.9899   1112.395
   1113.345   1153.728   805.5801   646.0727   617.1312   791.8318
   847.233    683.816    724.7269   911.1725   827.3728   995.0048
   800.6775   879.0817   972.6709   799.3595   1029.595   1007.769
   852.9899   837.8101   941.9149   982.4396   979.9702   967.2394
   937.1133   960.9035   908.2497   996.8404   1190.648   1202.747
   1350.496   1267.897   1132.526   1095.183   799.7894   639.9702
   962.9242]
```

FIG. 4B

```
injection_rate_f5=
  [769.6429   769.6754   769.6827   769.676    769.6537   769.6139
   769.551    769.4556   499.9228   499.8593   499.8334   1051.619
   1051.537   1051.517   1017.837   1017.895   787.5231   787.5018
   787.4812   127.3492   127.3549   240.9772   248.1084   400.2578
   663.3332   986.2067   936.059    1061.159   849.0998   884.3383
   1183.185   1208.31    981.9471   1076.72    1124.325   1008.958
   780.2723   692.6738   1044.181   804.3527   664.2988   713.3538
   768.6463   791.4963   1408.636   1460.505   1331.472   1436.979
   1223.143   1192.528   1165.123   1187.325   889.4554   1755.404
   1539.565   1367.623   1197.647   1204.832   1253.376   1064.125
   1221.669   1083.684   1029.96    941.9225   953.305    1135.038
   995.6816   1202.049   1179.09    1238.77    1262.872   195.4976
   796.9509   1409.679   2215.336   1971.793   1372.014   1194.094
   990.832    1240.13    1272.831   1110.265   1083.964   1277.695
   1224.066   1216.931   1036.133   1275.89    650.2736   493.1569
   443.461    457.3099   492.6304   514.841    490.7231   505.4795
   567.1318   544.3971   547.5244   528.4097   662.0999   964.6831
   1006.148   1102.357   1207.62    1272.277   1173.155   1125.227
   1039.502   1074.456   1146.245   1429.14    1246.974   1215.329
   1097.068]
```

FIG. 4C

Production_rate_P1 =
[2916.28    1893.82    1446.496   1223.643   1093.515   1027.691
 1025.575   1069.464   1350.653   1383.106   1404.12    3229.087
 3287.819   3292.214   3949.526   3934.924   1344.882   1276.475
 1281.724   2080.675   2170.162   2204.06    2733.114   2709.72
 1906.547   2226.197   2147.538   2396.16    2170.339   2295.214
 2325.382   2863.881   2633.29    2191.615   1823.576   2462.448
 2472.716   2426.248   2558.359   1898.222   2311.003   2405.334
 2359.773   2406.227   2404.66    2005.993   2470.426   2262.771
 2564.288   2187.93    2872.702   2817.843   2886.186   3159.216
 3071.983   3038.874   3232.614   3153.618   3396.065   3337.943
 3314.298   3228.766   3312.479   3214.223   2943.438   3374.134
 3471.613   3649.256   1494.396   2318.848   2353.137   1392.929
 2017.725   2497.875   2650.34    2772.884   2503.756   2341.685
 2665.939   2603.909   2361.046   2307.904   2466.254   2545.271
 2505.55    2239.917   2518.568   2521.566   2398.009   1700.699
 1570.964   2475.785   2666.951   2696.887   2733.822   2956.056
 2906.461   2566.767   2639.433   2717.689   2399.816   2175.098
 2405.237   2461.575   2513.077   2476.729   2467.291   2303.615
 2898.341   2858.363   3200.795   3426.61    3443.722   3647.533
 3996.801]

Production_rate_P2=
[195.3348  176.5879  161.8616  147.6775  132.3667  116.3203
 100.9762  90.91395  102.5056  111.2312  119.294   139.5639
 148.0501  154.4379  162.0608  166.5477  150.7256  143.1064
 137.4059  131.9734  127.8249  129.6863  136.1022  121.6995
 131.2575  144.92    150.0162  140.1022  146.21    156.451
 158.8149  162.6809  164.6031  156.6059  150.636   155.6411
 158.7302  166.232   171.0211  162.1327  161.2135  156.3216
 162.0996  166.6428  175.9184  176.8375  178.7133  178.7524
 178.3178  176.1973  180.4867  187.3193  199.2127  209.983
 210.1795  203.8254  201.1218  203.3554  199.8475  209.8946
 215.1455  215.6018  213.2703  199.2345  185.3278  197.2057
 205.0727  207.3002  193.6611  194.2139  193.8643  193.2228
 177.8776  191.4582  231.8191  227.0726  224.6594  229.7895
 230.8227  234.7384  206.1662  179.8467  167.3609  179.5732
 188.3897  180.9705  182.7036  202.3105  200.8232  203.9204
 189.2181  192.9531  204.6493  199.082   215.5948  223.7031
 213.8644  202.6964  208.5682  216.1876  217.9815  217.007
 217.463   221.4278  218.8876  228.6546  247.8913  255.3423
 274.8202  276.3341  269.6512  262.6747  239.2566  213.2598
 232.5995]

FIG. 5A

```
Production_rate_P3=
 [196.0692   179.3542   174.4489   179.1992   193.816    219.7416
  261.9235   307.7595   339.0413   349.1725   355.6877   355.0119
  353.4153   351.7466   334.9937   315.7924   338.9163   353.4399
  367.3095   370.7577   366.3222   338.1546   309.5753   302.9909
  343.3383   390.3582   442.8708   467.6517   475.7294   463.2386
  475.4719   512.9818   525.4725   546.562    555.4177   539.306
  499.4974   483.7216   504.7977   493.012    470.5119   433.9357
  442.8588   456.0057   512.4643   550.1924   558.0298   564.4106
  550.0839   538.8026   530.6313   523.3772   495.919    552.271
  570.1813   559.772    539.137    531.285    511.5488   489.0468
  483.7139   434.6737   391.9633   353.6852   341.9161   345.1014
  337.9316   347.3225   351.5463   368.2297   356.9464   385.1567
  367.8657   433.608    567.5147   609.7797   502.3615   441.0474
  421.461    421.8376   446.8344   468.2583   499.6648   542.9484
  556.0471   560.2142   552.7231   561.0404   498.0082   435.9498
  406.5746   388.8749   379.8109   384.6039   402.4961   406.7456
  417.0511   418.7817   404.1004   396.1866   381.1434   398.5426
  424.4879   419.1766   448.4539   459.9056   450.3682   429.8293
  402.7214   409.8873   434.7366   470.5877   491.6042   505.3956
  519.5607]

Production_rate_P4=
 [2379.811  1683.061  1348.136  1183.511  1096.342  1063.209
  1083.307  1137.872  1698.039  1777.531  1824.798  1990.391
  2049.531  2094.436  1982.723  1974.184  1931.659  1916.844
  1909.946  1859.683  1768.624  1733.896  1644.874  1566.663
  1802.985  2026.399  2002.01   2095.246  2341.096  2261.631
  2337.393  2534.549  2322.27   2333.124  2367.872  2336.886
  2235.952  2284.032  2240.623  2144.319  2069.301  1946.358
  1910.047  2043.538  2433.989  2556.197  2578.598  2568.367
  2534.411  2478.992  2395.445  2468.419  2459.169  2850.418
  2889.555  2898.655  2802.34   2630.252  2451.473  2667.949
  2813.618  2777.629  2657.484  2226.911  2225.193  2366.028
  2296.084  2321.493  2335.952  2351.763  2347.124  1576.808
  1743.489  1847.67   2869.197  3040.427  2686.383  2409.108
  2028.894  2091.013  1932.818  1923.021  1920.55   2171.707
  2086.544  2304.832  2344.914  2685.513  2448.996  2252.836
  2147.083  1971.758  2093.175  2196.932  2353.921  2357.346
  2326.293  2178.859  2293.083  2341.083  2452.64   2557.318
  2645.425  2778.83   2744.436  3066.146  3070.198  3004.751
  3008.488  2991.268  3074.413  3159.114  3126.601  2823.369
  2961.795]
```

FIG. 5B

Bottomhole_Pressure_PI = [2500] and constant for all times
Bottomhole_Pressure_P2 = [2500] and constant for all times
Bottomhole_Pressure_P3 = [2500] and constant for all times
Bottomhole_Pressure_P4 = [2500] and constant for all times

FIG. 6 time = [1,1.944202,3.803123,6.203458,9.420446,14.03878,21.35927,30.4375,44.67685,52.77593,60.875,76.09375,83.70312,91.3125,104.9416,121.75,136.9688,144.5781,152.1875,167.4062,182.625,213.0625,243.5,273.9375,304.375,334.8125,365.25,395.6875,426.125,456.5625,487,517.4375,547.875,578.3125,608.75,639.1875,669.625,700.0625,730.5,760.9375,791.375,821.8125,852.25,882.6875,913.125,943.5625,974,1004.438,1034.875,1065.312,1095.75,1126.188,1156.625,1187.062,1217.5,1247.938,1278.375,1308.812,1339.25,1369.688,1400.125,1430.562,1461,1491.438,1521.875,1552.312,1582.75,1613.188,1643.625,1674.062,1704.5,1734.938,1765.375,1795.812,1826.25,1856.688,1887.125,1917.562,1948,1978.438,2008.875,2039.312,2069.75,2100.188,2130.625,2161.062,2191.5,2221.938,2252.375,2282.812,2313.25,2343.688,2374.125,2404.562,2435,2465.438,2495.875,2526.312,2556.75,2587.188,2617.625,2648.062,2678.5,2708.938,2739.375,2769.812,2800.25,2830.688,2861.125,2891.562,2922,2952.438,2982.875,3013.312,3043.75]

FIG. 7

Injector_I1 to :[P1=0.92, P2=0.01, P3=0, P4=0.07]
Injector_I2 to :[P1=0.45, P2=0.03, P3=0.16, P4=0.36]
Injector_I3 to :[P1=0.17, P2=0.01, P3=0.04, P4=0.78]
Injector_I4 to :[P1=0.24, P2=0.13, P3=0, P4=0.63]
Injector_I5 to :[P1=0.14, P2=0.03, P3=0.22, P4=0.61]

FIG. 8A

Output Tau = [ PI=1.25, P2=0.016, P3=0.023, P4=1.97]

FIG. 8B

NEURAL ORDINARY DIFFERENTIAL EQUATION NETWORK FOR RESERVOIR MODELING

The present disclosure relates generally to the field of physics-constrained modeling of reservoir characteristics using a neural ordinary differential equation network.

BACKGROUND

Reservoir modeling using capacitance resistance model may result in numerous output that do not make physical sense. Review and selection of physically feasible output may be difficult and time consuming.

SUMMARY

This disclosure relates to reservoir modeling. Reservoir equation information, measurement information, and/or other information may be obtained. The reservoir equation information may define a set of physical equations for a reservoir. The set of physical equations may define physics of the reservoir. The measurement information for the reservoir may characterize measured characteristics of the reservoir. The set of physical equations for the reservoir may be modeled as a neural network. The neural network may be prepared based on the measured characteristics of the reservoir and/or other information. The prepared neural network may facilitate modeling of characteristics of the reservoir that is constrained by the physics of the reservoir.

A system for reservoir modeling may include one or more electronic storage, one or more processors and/or other components. The electronic storage may store information relating to a reservoir, reservoir equation information, information relating to physics of the reservoir, information relating to physical equations defining physics of the reservoir, measurement information, information relating to measured characteristics of the reservoir, information relating to modeling the physical equations, information relating to a neural network, information relating to preparation of the neural network, information relating to modeling of characteristics of the reservoir, and/or other information.

The processor(s) may be configured by machine-readable instructions. Executing the machine-readable instructions may cause the processor(s) to facilitate reservoir modeling. The machine-readable instructions may include one or more computer program components. The computer program components may include one or more of a physical equation component, measurement component, model component, preparation component, and/or other computer program components.

The physical equation component may be configured to obtain reservoir equation information and/or other information. The reservoir equation information may define one or more sets of physical equations for a reservoir. The set(s) of physical equations may define physics of the reservoir. In some implementations, the set(s) of physical equations may include capacitance-resistance modeling differential equations.

The measurement component may be configured to obtain measurement information for the reservoir and/or other information. The measurement information may characterize measured characteristics of the reservoir. In some implementations, the measured characteristics of the reservoir may include measured injection rates for injection wells in the reservoir and measured production rates for production wells in the reservoir.

The model component may be configured to model the set(s) of physical equations for the reservoir. The set(s) of physical equations for the reservoir may be modeled as a neural network. In some implementations, the neural network in which the set(s) of physical equations for the reservoir are modeled may be a single layer neural network.

The preparation component may be configured to prepare the neural network based on the measured characteristics of the reservoir, and/or other information. The prepared neural network may facilitate modeling of characteristics of the reservoir that is constrained by the physics of the reservoir. The prepared neural network may be used to model the characteristics of the reservoir. In some implementations, preparing the neural network may include determining parameters of the capacitance-resistance modeling differential equations by using the measured characteristics of the reservoir as boundary conditions.

In some implementations, the single layer neural network may output a single solution that is constrained by the physics of the reservoir.

In some implementations, the prepared neural network may receive as input measured injection rates for the injection wells and measured production rates for the production wells. The prepared neural network may provide as output inter-well connectivities and response times. In some implementations, the prepared neural network may further receive well locations as the input.

In some implementations, the measured injection rates for the injection wells and the measured production rates for the production wells may change as a function of time. The prepared neural network may model dynamic changes in the inter-well connectivities and the response times based on the changes in the measured injection rates for the injection wells and the measured production rates for the production wells as the function of time, and/or other information.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

BRIEF DESCRIPTION OF THE DRAWINGS

FIG. 3 illustrates an example loss function.

FIGS. 4A, 4B, and 4C illustrate example injection rates for five injection wells.

FIGS. 5A and 5B illustrate example production rates for four production wells.

FIG. 6 illustrates example bottom hole pressures for four production wells.

FIG. 7 illustrates example times corresponding to separate injection rates and production rates shown in FIGS. 4A, 4B, 4C, 5A, and 5B.

FIG. 8A illustrates example inter-well connectivities.

FIG. 8B illustrates example response times.

DETAILED DESCRIPTION

The present disclosure relates to reservoir modeling. Differential equations defining physics of a reservoir are modeled as a neural network. Measured data for the reservoir is used as boundary condition to calculate the different equation parameters. The result is a neural ordinary differential equation network that models reservoir characteristics (e.g., inter-well connectivities, response times for injection wells and production wells) using physics that are encoded into the network. The neural ordinary differential equation network provides a solution for the reservoir that is constrained by the physics of the reservoir.

Figure 1:
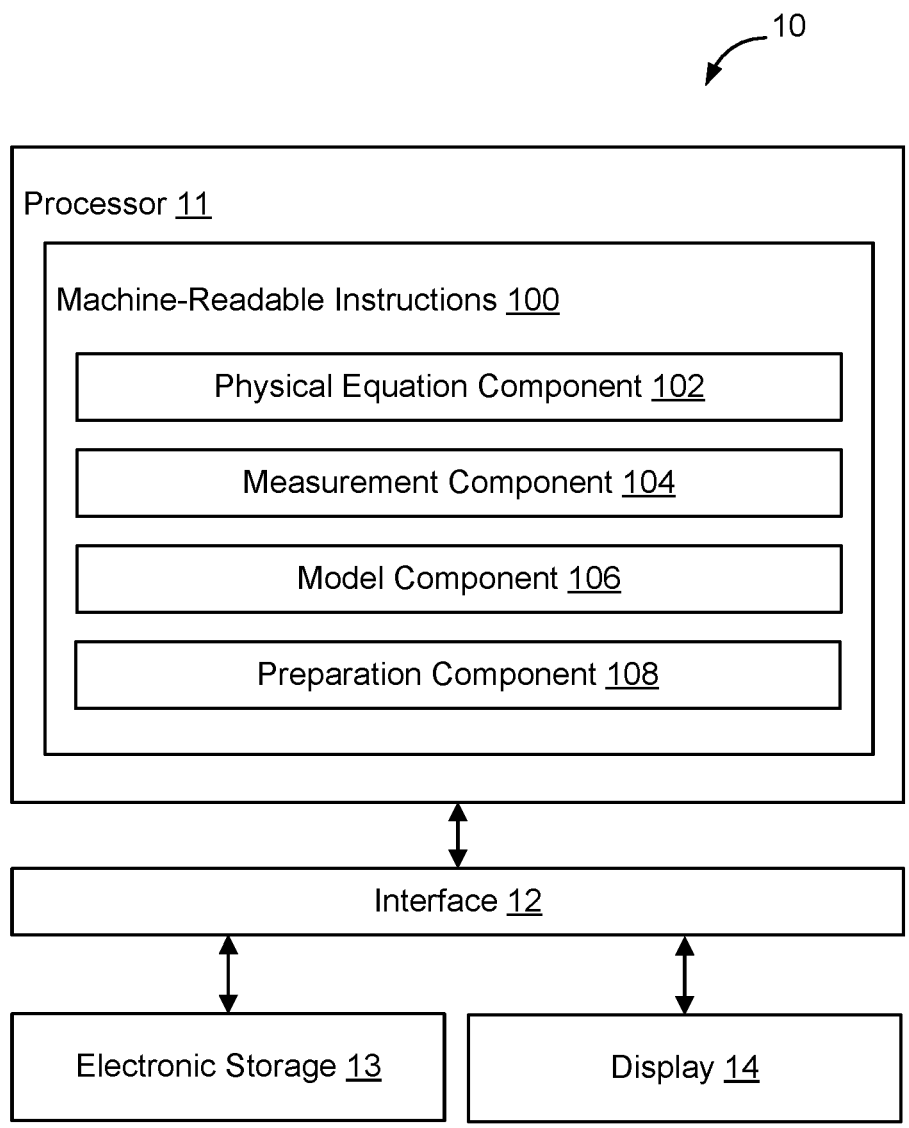
FIG. 1 illustrates an example system for reservoir modeling.

The methods and systems of the present disclosure may be implemented by a system and/or in a system, such as a system 10 shown in FIG. 1. The system 10 may include one or more of a processor 11, an interface 12 (e.g., bus, wireless interface), an electronic storage 13, a display 14, and/or other components. Reservoir equation information, measurement information, and/or other information may be obtained by the processor 11. The reservoir equation information may define a set of physical equations for a reservoir. The set of physical equations may define physics of the reservoir. The measurement information for the reservoir may characterize measured characteristics of the reservoir. The set of physical equations for the reservoir may be modeled as a neural network by the processor 11. The neural network may be prepared by the processor 11 based on the measured characteristics of the reservoir and/or other information. The prepared neural network may facilitate modeling of characteristics of the reservoir that is constrained by the physics of the reservoir.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store information relating to a reservoir, reservoir equation information, information relating to physics of the reservoir, information relating to physical equations defining physics of the reservoir, measurement information, information relating to measured characteristics of the reservoir, information relating to modeling the physical equations, information relating to a neural network, information relating to preparation of the neural network, information relating to modeling of characteristics of the reservoir, and/or other information.

The display 14 may refer to an electronic device that provides visual presentation of information. The display 14 may include a color display and/or a non-color display. The display 14 may be configured to visually present information. The display 14 may present information using/within one or more graphical user interfaces. For example, the display 14 may present information relating to modeling of reservoir characteristics. For instance, the display 14 may present one or more results of reservoir characteristic modeling (e.g., e.g., visual representations of reservoir characteristics, such as features, structures, properties, inter-well connectivities, response times).

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate reservoir modeling. The machine-readable instructions 100 may include one or more computer program components. The machine-readable instructions 100 may include a physical equation component 102, measurement component 104, model component 106, preparation component 108, and/or other computer program component.

The physical equation component 102 may be configured to obtain reservoir equation information and/or other information. Obtaining reservoir equation information may include one or more of accessing, acquiring, analyzing, determining, examining, identifying, loading, locating, opening, receiving, retrieving, reviewing, selecting, storing, and/or otherwise obtaining the reservoir equation information. The physical equation component 102 may obtain reservoir equation information from one or more locations. For example, the physical equation component 102 may obtain reservoir equation information from a storage location, such as the electronic storage 13, electronic storage of a device accessible via a network, and/or other locations. The physical equation component 102 may obtain reservoir equation information from one or more hardware components (e.g., a computing device) and/or one or more software components (e.g., software running on a computing device).

The reservoir equation information may define one or more sets of physical equations for a reservoir. A reservoir may refer to a location at which one or more resources are stored. For example, a reservoir may refer to a location at which hydrocarbon are stored. For instance, a reservoir may refer to a location including rocks in which oil and/or natural gas have accumulated. A reservoir may include regions above the surface, at the surface, and/or below the surface. For example, a reservoir may include one or more subsurface regions. A subsurface region may refer to a part of earth located beneath the surface/located underground. A subsurface region may refer to a part of earth that is not exposed at the surface of the ground. A reservoir may include one or more wells. For example, a reservoir may include one or more injection wells (e.g., for injection of fluid), one or more production wells (e.g., for extraction of oil or gas), and/or other wells.

A set of physical equations for a reservoir may include one or more physical equations for the reservoir. The reservoir equation information may define a set of physical equations by including information that defines (e.g., identifies, specifies, reflects, quantifies) content of the set of physical equations, such as equations, variables, coefficients, constants, operators, parameters, expressions, terms, conditions, and/or other content of the set of physical equations. For instance, the reservoir equation information may include information that makes up and/or is used to determine physical equations(s) within a set of physical equations. Other types of reservoir equation information are contemplated.

The set(s) of physical equations may define physics of the reservoir. Physics of the reservoir may refer to nature, properties, motion, interaction, relationship, behavior, and/or other physics of matter within the reservoir. Physics of the reservoir may be dynamic (changing with time) and/or static (not changing with time). For example, the set(s) of physical equations may define physics of rock and flow within the reservoir. In some implementations, the set(s) of physical equations may be specified/selected to model a desired system in a way to answer one or more specific questions/inquiries regarding the reservoir. In some implementations, the set(s) of physical equations may define physics of the reservoir by including one or more differential equations (e.g., ordinary differential equations, partial differential equations, stochastic differential equations). For example, the set(s) of physical equations may include capacitance-resistance modeling differential equations, such as discussed in Weber, et al. "Improvements in Capacitance-Resistive Modeling and Optimization of Large Scale Reservoirs," SPE 121299, 2009 SPE Western Regional Meeting held in San Jose, Calif., USA, 24-26 Mar. 2009, which is incorporated by reference in its entirety. Capacitance-resistance modeling is discussed in the following, and each of these documents is incorporated by reference in its entirety: (i) Sayarpour, et al., "The Use of Capacitance-Resistive Models for Rapid Estimation of Waterflood Performance and Optimization", SPE 110081, 2007 SPE Annual Technical Conference and Exhibition held in Anaheim, Calif., USA, 11-14 Nov. 2007, (ii) Sayarpour, et al., "Field Applications of Capacitance Resistive Models in Waterfloods", SPE 114983-MS, 2008 SPE Annual Technical Conference and Exhibition held in Denver, Colo., USA, 21-24 Sep. 2008, (iii) Sayarpour, et al., "Field Applications of Capacitance Resistive Models in Waterfloods", SPE 114983-PA, December 2009 SPE Reservoir Evaluation & Engineering, (iv) Sayarpour, et al., "Probabilistic History Matching With the Capacitance-Resistance Model in Waterfloods: A Precursor to Numerical Modeling", SPE 129604, 2010 SPE Improved Oil Recovery Symposium held in Tulsa, Okla., USA, 24-28 Apr. 2010, and (v) Sayarpour, M., "Development and Application of Capacitance-Resistive Models to Water/CO2 Floods", pages 1-236, available at http://repositories.lib.utexas.edu/handle/2152/15357?show=full, which are all incorporated by reference in their entireties. Capacitance-resistance modeling is also discussed in U.S. Pat. No. 10,760,379, titled "FLOODING ANALYSIS TOOL AND METHOD THEREOF," which is which is incorporated by reference in its entirety.

Physical equations for a reservoir may be used to model the reservoir. For example, physical equations for a reservoir may be used to model changes in rock configuration within the reservoir. For instance, capacitance resistance modeling may be an analytical flow model built directly from historical injection/production data of wells in the reservoir. Capacitance resistance modeling may relate production to injection rates using material balance and signal processing. Capacitance resistance modeling may be used to history-match, forecast, and/or optimize well, pattern, and/or performances for the reservoir. Capacitance resistance modeling may quantify flood performance by inter-well/section connectivities.

Capacitance resistance modeling may require use of solvers to fit historical data to models. This may require validation of model inter-well static connectivities and responsive times (physical parameters) that often times do not make physical sense. Capacitance resistance modeling may result in uncertainties that are difficult and time-consuming to reduce (e.g., by performing sensitivity analysis using multiple simulations to select optimal models). Capacitance resistance modeling may output multiple solutions with large error ranges, with the solutions becoming less reliable with more sparse and noisy input data. For example, capacitance resistance modeling may output numerous solutions for the same problem, with many solutions being physically non-feasible and only a few solutions being realistic. The present disclosure, on the other hand, may provide solutions that are physically viable. The present disclosure may not provide solutions that are not physically viable. The present disclosure may enable users to get to the solution without having to analyze the viability of different solutions. The present disclosure may provide physically viable solution from noisy and sparse input data.

The measurement component 104 may be configured to obtain measurement information for the reservoir and/or other information. Obtaining measurement information may include one or more of accessing, acquiring, analyzing, determining, examining, identifying, loading, locating, opening, receiving, retrieving, reviewing, selecting, storing, and/or otherwise obtaining the measurement information. The measurement component 104 may obtain measurement information from one or more locations. For example, the measurement component 104 may obtain measurement information from a storage location, such as the electronic storage 13, electronic storage of a device accessible via a network, and/or other locations. The measurement component 104 may obtain measurement information from one or more hardware components (e.g., a computing device) and/or one or more software components (e.g., software running on a computing device).

The measurement information may characterize measured characteristics of the reservoir. Measured characteristics of the reservoir may refer to characteristics of the reservoir that are directly and/or indirectly measured. Characteristics of the reservoir may refer to attribute, quality, configuration, and/or characteristics of matter within the reservoir (e.g., above the surface, at the surface, below the surface). Characteristics of the reservoir may refer to environmental characteristics, such as physical arrangement, composition, properties, and/or characteristics of materials (e.g., subsurface elements) within the reservoir. Characteristics of the reservoir may refer to design characteristics, such as information relating to design of one or more wells (e.g., well spacing, well location) within the reservoir. Characteristics of the reservoir may refer operational characteristics, such as to information relating to operation of one or more wells in the reservoir (e.g., operating characteristics of well(s) in the reservoir). For example, the measured characteristics of the reservoir may include measured injection rates for injection well(s) in the reservoir, measured production rates for production well(s) in the reservoir, measured bottom hole pressures for the injection well(s) and the production well(s) in the reservoir, and/or other operating characteristics of the injection well(s) and production well(s). Characteristics of the reservoir may refer to maintenance characteristics, such as inspection interval, maintenance events, alarm/false alarm rates, of one or more wells in the reservoir. Other characteristics of the reservoir are contemplated.

The measurement information may characterize measured characteristics of the reservoir by describing, defining, and/or otherwise characterizing measured characteristics of the reservoir. The measurement information may directly and/or indirectly characterize measured characteristics of the reservoir. For example, the measurement information may include process measurements, such as flow, pressure, and temperature, which may be used to infer characteristics of the reservoir based on known physical relationships.

The model component 106 may be configured to model the set(s) of physical equations for the reservoir. The model component 106 may model the set(s) of physical questions for the reservoir using neural network architecture. The set(s) of physical equations for the reservoir may be modeled as a neural network. In the neural network, the activation function may be replaced with one or more physical equations. For example, the activation function in the neural network may be replaced with capacitance-resistance modeling differential equations.

The set(s) of physical equations for the reservoir may be modeled in the neural network using one or more nodes. For example, separate nodes may be used for/include/represent individual wells in a multi-well reservoir. Separate nodes may be used for/include/represent separate physical equations or separate sets of physical equations. A single node may be used for/include/represent combination of physical equations or combination of sets of physical equations. For example, separate nodes may be used to represent individuals wells in the reservoir, with the individual nodes including the combination of physical equations/sets of physical equations. For instance, for a reservoir including five injection wells and four production wells, the input layer of the neural network may include five nodes and the output layer of the neural network may include four nodes. Individual nodes in the input layer may represent individual injection wells in the reservoir and individual nodes in the output layer may represent individual production wells in the reservoir. Other numbers of wells and nodes are contemplated. The nodes of the neural network may form a graph, and traversing the graph (going from the first node to the last node) may collapse the mathematics within the graph to the differential equation network that represents the reservoir.

For example, the model component 106 may model capacitance-resistance modeling differential equations as a neural ordinary differential equation network. Example capacitance-resistance modeling differential equations for tank representation of field (CRMT), tank representation of producer (CRMP), and tank representation of volume between injector-producer pair (CRMIP) are provided below.

$$CRMT \left| \begin{array}{l} \dfrac{dq(t)}{dt} + \dfrac{1}{\tau}q(t) = \dfrac{1}{\tau}i(t) - J\dfrac{dp_{wf}}{dt} \\ \tau = \dfrac{c_t V_P}{J} \end{array} \right.$$

$$CRMP \left| \begin{array}{l} \dfrac{dq_j(t)}{dt} + \dfrac{1}{\tau_j}q_j(t) = \dfrac{1}{\tau_j}\sum_{i=1}^{N_{inj}} f_{ij}i_i - J_j\dfrac{dp_{wf,j}}{dt} \\ (\text{for } j = 1, 2, \ldots, N_{pro}) \\ \tau_j = \left(\dfrac{c_t V_P}{J}\right)_j \end{array} \right.$$

$$CRMIP \left| \begin{array}{l} \dfrac{dq_{ij}(t)}{dt} + \dfrac{1}{\tau_{ij}}q_{ij}(t) = \dfrac{1}{\tau_{ij}}f_{ij}i_i - J_{ij}\dfrac{dp_{wf,j}}{dt} \\ (\text{for } i = 1, 2, \ldots, N_{inj} \text{ and } j = 1, 2, \ldots, N_{pro}) \\ \tau_{ij} = \left(\dfrac{c_t V_P}{J}\right)_{ij} \end{array} \right.$$

Such modeling of the set(s) of physical equations may enable use of artificial intelligence techniques to solve the equation parameters in a way that is robust to limited and noisy input data. The resulting physics-based model may be continuous vector fields that are fully differentiable end to end to enable new insights into physical processes of the reservoir/wells in the reservoir. Such modeling of the set(s) of physical equations may provide for modeling of dynamic inter-well connectivities and response times (physical parameters). Such modeling of the set(s) of physical equations may enable various capabilities, such as uncertainty quantification, optimization, and/or continuous state transformation for investigating unknown relationships within the reservoir.

For example, more reliable forecasting over longer periods of time with capabilities of quantifying uncertainty with ensemble algorithms may be enabled by the neural network. Models of different physical phenomena (different boundary conditions) may be combined to investigate previously unknown relationships of physical phenomena in the reservoir.

In some implementations, the neural network in which the set(s) of physical equations for the reservoir are modeled may be a multi-layer neural network. That is, the set(s) of physical equations for the reservoir may be modeled as a multi-layer neural network (e.g., multi-layer neural ordinary differential equation network). Use of multi-layer neural network may enable modeling of entire fields and interactions within the reservoir, rather than being limited to a set of wells in the reservoir. The multi-layer neural network may be used to capture the dynamics in response times and connectivities of wells.

In some implementations, the neural network in which the set(s) of physical equations for the reservoir are modeled may be a single layer neural network. That is, the set(s) of physical equations for the reservoir may be modeled as a single layer neural network (e.g., single layer neural ordinary differential equation network). Use of single-layer neural network may enable generation of a single solution that is constrained by the physics of the reservoir (as defined by the set(s) of physical equations).

The preparation component 108 may be configured to prepare the neural network based on the measured characteristics of the reservoir, and/or other information. Preparing the neural network may include making the neural network ready for reservoir modeling. For example, preparing the neural network may include making the neural network ready for modeling inter-well connectivities and response times in the reservoir.

Preparing the neural network may include determining (e.g., calculating) parameters of the set(s) of physical equations. The differential equations parameters may be calculated to model the desired system. For example, preparing the neural network may include determining parameters (e.g., coefficients) of the capacitance-resistance modeling differential equations. For instance, the capacitance resistance modeling different equations may include one or more coefficients (e.g., constant(s) that affect weight of variable(s) in the equation) that affect calculation of modeled behavior. Preparing the neural network may include determining value (s) of the coefficients such that the desired modeling of the reservoir is achieved. For example, values of coefficients tau and J may be determined for the capacitance-resistance modeling differential equations. Separate values of coefficients may be determined for different nodes of the neural network (e.g., for physical equations corresponding to different wells).

The parameters of the set(s) of physical equations may be determined by using the measured characteristics of the reservoir as boundary conditions (model value constraint, conditions that cannot be violated). Rather than using history matching, the preparation component 108 may use the measured characteristics of the reservoir as boundary conditions to prepare the neural network. For example, the values of coefficients may be adjusted (e.g., randomly) until that the set(s) of physical equations model/match the measured characteristics of the reservoir. The set(s) of physical equations may be fit to the boundary conditions such that the boundary conditions cannot be violated during modeling. That is, the values of the coefficients may be determined using the measured characteristics of the reservoir as boundary condition such that physics of the reservoir cannot violated during modeling.

Sparse and/or noisy data may be used to prepare the neural network as the data is not required for the model to learn the physics of the reservoir. Instead, the physics of the reservoir are defined within the neural network. This alleviates the time consuming need to generate simulated data to train models and to validate the models. This also enables modeling to be valid for reservoirs outside the data set as long as the physics defined within the neural network is accurate, resulting in more accurate forecasting and extrapolation capabilities.

In some implementations, the parameters of the set(s) of physical equations may be determined by minimizing the loss function that is set as the neural network objective function. The combination of neural network architecture (e.g., neural ordinary differential equation network architecture) with physics-informed neural architecture may encode the underlying physical information to the neural network through physics-informed function, which may act as additional regularizing terms in the loss function. An example loss function is shown in FIG. 3. In some implementations, one or more differential equation solvers may be used to calculate forward and reverse gradients of the neural network. The neural network architecture may be used to solve the differential equations and select the parameters to model the desired system.

The prepared neural network may facilitate modeling of one or more characteristics of the reservoir. The prepared neural network may be used to model the characteristics of the reservoir. The prepared neural network may output characteristic(s) of the reservoir and/or may output information from which modeled characteristic(s) of the reservoir may be determined. The modeling of the characteristic(s) of the reservoir by the prepared neural network may be constrained by the physics of the reservoir (as defined by the set(s) of physical equations). The solution/output provided by the prepared neural network may be a physical solution that has less uncertainty than solution provided by capacitance resistance modeling. The prepared neural network may provide greater efficiencies and greater capabilities than capacitance resistance modeling.

In some implementations, the prepared neural network may include a single layer neural network. The single layer neural network may output a single solution (e.g., inter-well connectivities, response times) that is constrained by the physics of the reservoir. That is, the single layer neural network may output a single solution that is physically valid/feasible. In some implementations, the output of the prepared neural network (e.g., the single solution output by the single layer neural network) may be validated based on a comparison with a capacitance resistance model solution, and/or vice versa. For example, whether the output of the prepared neural network is valid or not may be determined based on comparison to output of capacitance resistance model. The solution output by the single layer neural network may be directly comparable to the solution output by the capacitance resistance model.

In some implementations, the prepared neural network (e.g., single layer neural network) may receive as input measured injection rates for injection wells in the reservoir, measured production rates for production wells in the reservoir, measured bottom hole pressures for the injection wells and/or the production wells, and/or other information. For example, the prepared neural network may receive as input injection rates for five injection wells shown in FIGS. 4A, 4B, and 4C, production rates for four production wells shown in FIGS. 5A, and 5B, and bottom hole pressures for four production wells shown in FIG. 6. In some implementations, some or all of the information received as input may be received as a function of time. That is, values of injection rates, production rates, and/or bottom hole pressures may be received for different times. FIG. 7 illustrates example times corresponding to separate injection rates and production rates shown in FIGS. 4A, 4B, 4C, 5A, and 5B. In some implementations, the prepared neural network may further receive well locations as the input. The well locations may include/define distance between the injection wells to the production wells. Provision of other input to the prepared neural network is contemplated.

The prepared neural network (e.g., single layer neural network) may provide as output inter-well connectivities and response times. FIG. 8A illustrates example inter-well connectivities output by the prepared neural network, and FIG. 8B illustrates example response times output by the prepared neural network. Inter-well connectivities output by the prepared neural network may include connectivities between individual injection wells to impacted production wells, such as production wells close to the injection wells. The prepared neural network may output inter-well connectivities for pairs of injection wells and production wells. Response times output by the prepared neural network may include a lag time between the injection wells and the production wells (e.g., lag times for pairs of injection wells and production wells). The response times may depend on physical characteristics/properties at, around, and/or between the injection wells and the production wells, and/or the distance between the injection wells and the production wells. Examples of inter-well connectivities and response times are provided in U.S. Pat. No. 10,760,379. Use of the prepared neural network to provide other output is contemplated.

Unlike capacitance resistance modeling, the prepared neural network may be able to dynamically model changes in the reservoir. Capacitance resistance modeling may allow for application to a specific time window (e.g., 40 year time period). Within the time window, response time and connectivities of wells in the reservoir may change over time. Capacitance resistance modeling may assume that the response times and connectivities of wells remain static within the time window, and provide a steady-state solution (average representation of what is happening in the reservoir).

The prepared neural network (e.g., single layer neural network), on the other hand, may dynamically model changes in the reservoir. Input to the prepared neural network may be provided as a function of time, rather than being constant over time. For instance, the measured injection rates for the injection wells and the measured production rates for the production wells that are provided as input to the prepared neural network may change as a function of time. The prepared neural network may model dynamic changes in the inter-well connectivities and the response times based on the changes in the measured injection rates for the injection wells and the measured production rates for the production wells as the function of time, and/or other information. Thus, the prepared neural network may facilitate dynamic modeling of the reservoir.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). A machine-readable medium may include non-transitory computer-readable medium. For example, a tangible computer-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11, the electronic storage 13, and the display 14 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11, the electronic storage 13, and the display 14 are shown in FIG. 1 as single entities, this is for illustrative purposes only. One or more of the components of the system 10 may be contained within a single device or across multiple devices. For instance, the processor 11 may comprise a plurality of processing units. These processing units may be physically located within the same device, or the processor 11 may represent processing functionality of a plurality of devices operating in coordination. The processor 11 may be separate from and/or be part of one or more components of the system 10. The processor 11 may be configured to execute one or more components by software; hardware; firmware; some combination of software, hardware, and/or firmware; and/or other mechanisms for configuring processing capabilities on the processor 11.

It should be appreciated that although computer program components are illustrated in FIG. 1 as being co-located within a single processing unit, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
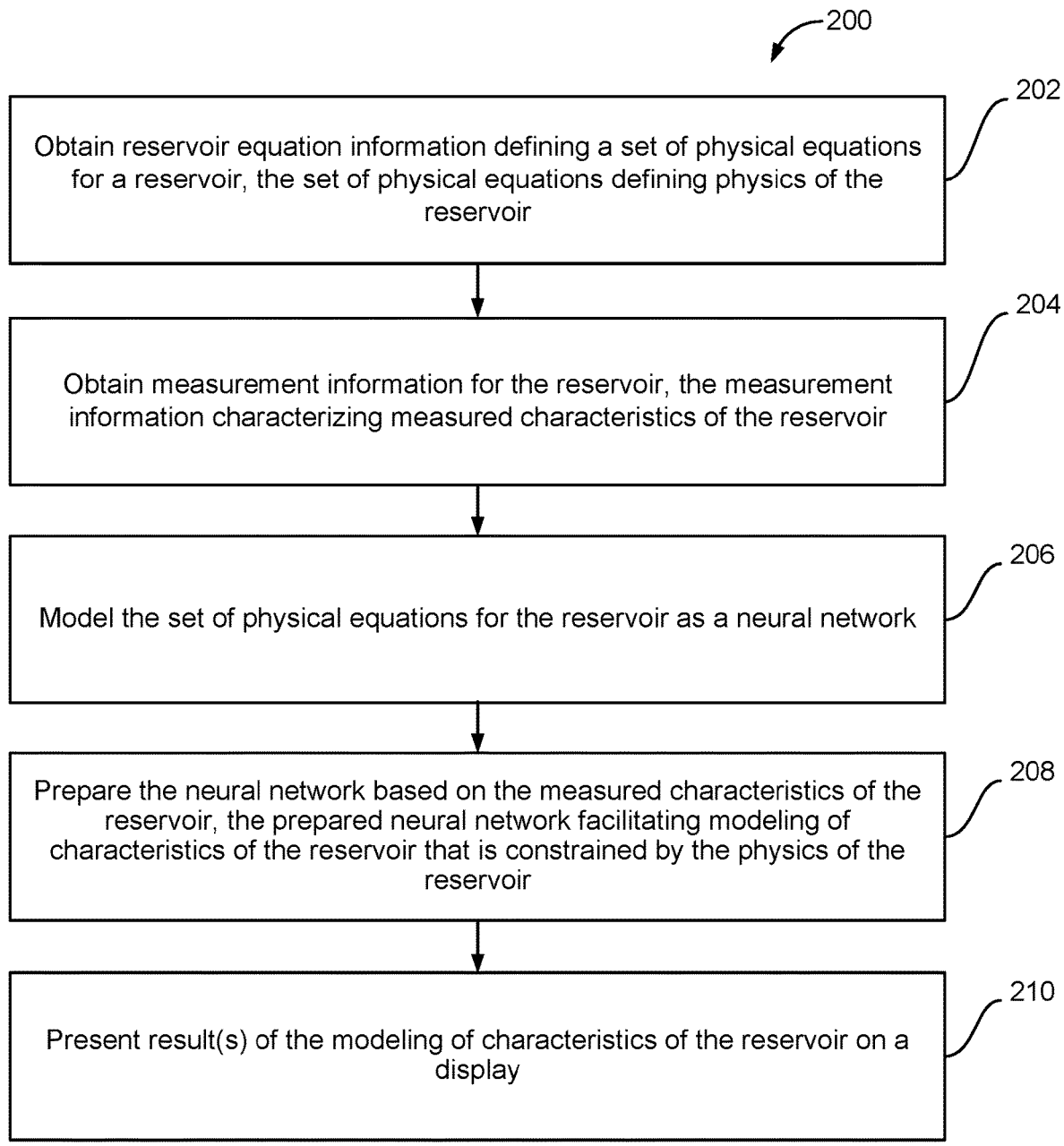
FIG. 2 illustrates an example method for reservoir modeling.

FIG. 2 illustrates method 200 for reservoir modeling. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operations of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, at operation 202, reservoir equation information may be obtained. The reservoir equation information may define a set of physical equations for a reservoir. The set of physical equations may define physics of the reservoir. In some implementation, operation 202 may be performed by a processor component the same as or similar to the physical equation component 102 (Shown in FIG. 1 and described herein).

At operation 204, measurement information may be obtained. The measurement information for the reservoir may characterize measured characteristics of the reservoir. In some implementation, operation 204 may be performed by a processor component the same as or similar to the measurement component 104 (Shown in FIG. 1 and described herein).

At operation 206, the set of physical equations for the reservoir may be modeled as a neural network. In some implementation, operation 206 may be performed by a processor component the same as or similar to the model component 106 (Shown in FIG. 1 and described herein).

At operation 208, the neural network may be prepared based on the measured characteristics of the reservoir and/or other information. The prepared neural network may facilitate modeling of characteristics of the reservoir that is constrained by the physics of the reservoir. In some implementation, operation 208 may be performed by a processor component the same as or similar to the preparation component 108 (Shown in FIG. 1 and described herein).

At operation 210, one or more results of the modeling of characteristics of the reservoir may be presented on a display. The prepared neural network may be used to model the characteristics of the reservoir and the result(s) and/or information relating to the result(s) may be presented on the display. The result(s) of the modeling may include physically valid/feasible reservoir characteristics, such as features, structures, properties, inter-well connectivities, response times that are physically valid/feasible. The result(s) of the modeling may not include physically invalid/non-feasible reservoir characteristics. In some implementation, operation 210 may be performed using a component the same as or similar to the display 14 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for reservoir modeling, the system comprising:
    one or more physical processors configured by machine-readable instructions to:
        obtain reservoir equation information defining a set of physical equations for a reservoir including multiple wells, the multiple wells including a first well and a second well, the set of physical equations defining physics of the reservoir, the set of physical equations including one or more first physical equations for the first well and one or more second physical equations for the second well;
        obtain measurement information for the reservoir, the measurement information characterizing measured characteristics of the reservoir;
        model the set of physical equations for the reservoir as a neural network, the neural network including individual nodes for individual wells in the reservoir, the neural network including a first node for the first well and a second node for the second well, the first node including the one or more first physical equations for the first well and the second node including the one or more second physical equations for the second well, wherein traversal of the nodes of the neural network collapses the one or more first physical equations for the first well included in the first node and the one or more second physical equations for the second well included in the second node into a differential equation network that represents the reservoir; and
        prepare the neural network based on the measured characteristics of the reservoir, the prepared neural network facilitating modeling of characteristics of the reservoir that is constrained by the physics of the reservoir.

2. The system of claim 1, wherein:
the multiple wells include an injection well and a production well;
an input layer of the neural network includes a node for the injection well; and
an output layer of the neural network includes a node for the production well.

3. The system of claim 1, wherein:
the set of physical equations includes capacitance-resistance modeling differential equations; and
preparing the neural network includes determining values of coefficients of the capacitance-resistance modeling differential equations by using the measured characteristics of the reservoir as boundary conditions, wherein separate values of coefficients are determined for different nodes of the neural network.

4. The system of claim 3, wherein the measured characteristics of the reservoir include measured injection rates for injection wells in the reservoir and measured production rates for production wells in the reservoir.

5. The system of claim 4, wherein the neural network in which the set of physical equations for the reservoir is modeled is a single layer neural network.

6. The system of claim 5, wherein the single layer neural network outputs a single solution that is constrained by the physics of the reservoir.

7. The system of claim 1, wherein the one or more physical processors are further configured by the machine-readable instructions to model the characteristics of the reservoir using the prepared neural network.

8. The system of claim 7, wherein the prepared neural network receives as input measured injection rates for injection wells and measured production rates for production wells, and provides as output inter-well connectivities and response times.

9. The system of claim 8, wherein the prepared neural network further receives well locations as the input.

10. The system of claim 8, wherein the measured injection rates for the injection wells and the measured production rates for the production wells change as a function of time and the prepared neural network models dynamic changes in the inter-well connectivities and the response times based on the changes in the measured injection rates for the injection wells and the measured production rates for the production wells as the function of time.

11. A method for reservoir modeling, the method comprising:

obtaining reservoir equation information defining a set of physical equations for a reservoir including multiple wells, the multiple wells including a first well and a second well, the set of physical equations defining physics of the reservoir, the set of physical equations including one or more first physical equations for the first well and one or more second physical equations for the second well;

obtaining measurement information for the reservoir, the measurement information characterizing measured characteristics of the reservoir;

modeling the set of physical equations for the reservoir as a neural network, the neural network including individual nodes for individual wells in the reservoir, the neural network including a first node for the first well and a second node for the second well, the first node including the one or more first physical equations for the first well and the second node including the one or more second physical equations for the second well, wherein traversal of the nodes of the neural network collapses the one or more first physical equations for the first well included in the first node and the one or more second physical equations for the second well included in the second node into a differential equation network that represents the reservoir; and preparing the neural network based on the measured characteristics of the reservoir, the prepared neural network facilitating modeling of characteristics of the reservoir that is constrained by the physics of the reservoir.

12. The method of claim 11, wherein:
the multiple wells include an injection well and a production well;
an input layer of the neural network includes a node for the injection well; and
an output layer of the neural network includes a node for the production well.

13. The method of claim 11, wherein:
the set of physical equations includes capacitance-resistance modeling differential equations; and
preparing the neural network includes determining values of coefficients of the capacitance-resistance modeling differential equations by using the measured characteristics of the reservoir as boundary conditions, wherein separate values of coefficients are determined for different nodes of the neural network.

14. The method of claim 13, wherein the measured characteristics of the reservoir include measured injection rates for injection wells in the reservoir and measured production rates for production wells in the reservoir.

15. The method of claim 14, wherein the neural network in which the set of physical equations for the reservoir is modeled is a single layer neural network.

16. The method of claim 15, wherein the single layer neural network outputs a single solution that is constrained by the physics of the reservoir.

17. The method of claim 11, further comprising modeling the characteristics of the reservoir using the prepared neural network.

18. The method of claim 17, wherein the prepared neural network receives as input measured injection rates for injection wells and measured production rates for production wells, and provides as output inter-well connectivities and response times.

19. The method of claim 18, wherein the prepared neural network further receives well locations as the input.

20. The method of claim 18, wherein the measured injection rates for the injection wells and the measured production rates for the production wells change as a function of time and the prepared neural network models dynamic changes in the inter-well connectivities and the response times based on the changes in the measured injection rates for the injection wells and the measured production rates for the production wells as the function of time.

21. A non-transitory computer-readable medium having computer-executable instructions stored thereon which, when executed by a computer, cause the computer to perform reservoir modeling by executing steps comprising:

obtaining reservoir equation information defining a set of physical equations for a reservoir including multiple wells, the multiple wells including a first well and a second well, the set of physical equations defining physics of the reservoir, the set of physical equations including one or more first physical equations for the first well and one or more second physical equations for the second well;

obtaining measurement information for the reservoir, the measurement information characterizing measured characteristics of the reservoir;

modeling the set of physical equations for the reservoir as a neural network, the neural network including individual nodes for individual wells in the reservoir, the neural network including a first node for the first well and a second node for the second well, the first node including the one or more first physical equations for the first well and the second node including the one or more second physical equations for the second well, wherein traversal of the nodes of the neural network collapses the one or more first physical equations for the first well included in the first node and the one or more second physical equations for the second well included in the second node into a differential equation network that represents the reservoir; and preparing the neural network based on the measured characteristics of the reservoir, the prepared neural network facilitating modeling of characteristics of the reservoir that is constrained by the physics of the reservoir.

* * * * *